United States Patent
Sago et al.

(10) Patent No.: US 10,930,911 B2
(45) Date of Patent: Feb. 23, 2021

(54) SEPARATOR FOR METAL SECONDARY BATTERIES

(71) Applicants: TOKYO OHKO KOGYO CO., LTD., Kanagawa (JP); TOKYO METROPOLITAN UNIVERSITY, Tokyo (JP); 3DOM INC., Kanagawa (JP)

(72) Inventors: Hiroyoshi Sago, Kanagawa (JP); Kiyoshi Kanamura, Tokyo (JP); Hirokazu Munakata, Tokyo (JP); Kazuhiro Imazawa, Kanagawa (JP)

(73) Assignees: TOKYO OHKA KOGYO CO., LTD., Kanagawa (JP); TOKYO METROPOLITAN UNIVERSITY, Tokyo (JP); 3DOM INC, Kanagawa (JP)

( * ) Notice: Subject to any disclaimer, the term of this patent is extended or adjusted under 35 U.S.C. 154(b) by 0 days.

(21) Appl. No.: 15/510,768

(22) PCT Filed: Aug. 27, 2015

(86) PCT No.: PCT/JP2015/074261
§ 371 (c)(1),
(2) Date: Mar. 13, 2017

(87) PCT Pub. No.: WO2016/047360
PCT Pub. Date: Mar. 31, 2016

(65) Prior Publication Data
US 2017/0279101 A1    Sep. 28, 2017

(30) Foreign Application Priority Data
Sep. 22, 2014 (JP) .............................. JP2014-192995

(51) Int. Cl.
| | | |
|---|---|---|
| *H01M 2/16* | (2006.01) | |
| *H01M 10/0525* | (2010.01) | |
| *H01M 10/058* | (2010.01) | |
| *H01M 10/0565* | (2010.01) | |
| *H01M 12/08* | (2006.01) | |
| *H01M 4/38* | (2006.01) | |

(52) U.S. Cl.
CPC ......... *H01M 2/1653* (2013.01); *H01M 2/166* (2013.01); *H01M 2/1686* (2013.01); *H01M 10/058* (2013.01); *H01M 10/0525* (2013.01); *H01M 10/0565* (2013.01); *H01M 12/08* (2013.01); *H01M 4/38* (2013.01); *Y02E 60/10* (2013.01)

(58) Field of Classification Search
CPC combination set(s) only.
See application file for complete search history.

(56) References Cited

U.S. PATENT DOCUMENTS

| | | | |
|---|---|---|---|
| 5,830,603 A * | 11/1998 | Oka .................... | H01M 2/1653 429/249 |
| 6,432,586 B1 | 8/2002 | Zhang | |
| 9,490,463 B2 * | 11/2016 | Yong .................... | H01M 2/166 |
| 2004/0096737 A1 | 5/2004 | Kim et al. | |
| 2004/0214089 A1 | 10/2004 | Lee et al. | |
| 2005/0196677 A1 | 9/2005 | Lee et al. | |
| 2008/0241697 A1 | 10/2008 | Imachi | |
| 2009/0029253 A1 * | 1/2009 | Itou ....................... | H01M 4/525 429/223 |
| 2013/0005919 A1 * | 1/2013 | Kanzaki ................ | B01J 20/261 525/384 |
| 2014/0170478 A1 * | 6/2014 | Liao .................. | H01M 10/0525 429/199 |
| 2014/0302373 A1 * | 10/2014 | Lockett ............... | C07D 233/58 429/124 |
| 2014/0329130 A1 | 11/2014 | Kanamura et al. | |

FOREIGN PATENT DOCUMENTS

| | | |
|---|---|---|
| CN | 1610170 | 4/2005 |
| JP | 2001-319634 | 11/2001 |
| JP | 2003-242954 | 8/2003 |
| JP | 2004-172121 | 6/2004 |
| JP | 2004-259483 | 9/2004 |
| JP | 2005-310795 | 11/2005 |
| JP | 2008-270160 | 11/2008 |
| JP | 2011-60539 | 3/2011 |
| JP | 2011-111470 | 6/2011 |
| JP | 2012-107144 | 6/2012 |
| JP | WO 2014147958 | * 9/2014 |
| WO | 2013/084368 | 6/2013 |

OTHER PUBLICATIONS

International Search Report dated Oct. 13, 2015, in International (PCT) Application No. PCT/JP2015/074261.
Office Action dated Apr. 9, 2019 in corresponding Chinese patent application No. 201580050383.6.

* cited by examiner

*Primary Examiner* — Kaity V Chandler
(74) *Attorney, Agent, or Firm* — Wenderoth, Lind & Ponack, L.L.P.

(57) ABSTRACT

Provided is a separator which can make the electric field on the surface of a negative electrode for a metal secondary battery homogeneous to thereby prevent the formation of dendrites. A porous separator for metal secondary batteries, which has a polymer electrolyte layer formed on the surface layer of at least one main surface of a porous polyimide film. It is preferred that the polymer electrolyte layer is composed of both a polymer electrolyte material which is supported on at least one main surface of the porous polyimide film and a polymer electrolyte material which is supported in voids in a layered region that extends from the main surface.

19 Claims, 4 Drawing Sheets

SEPARATOR FOR METAL SECONDARY BATTERIES

TECHNICAL FIELD

The present invention relates to a separator for metal secondary batteries.

BACKGROUND ART

Secondary batteries using a metal negative electrode are promising as large capacity storage batteries, and therefore have conventionally received attention. For the negative electrode for metal secondary batteries, for example, lithium, sodium, magnesium, zinc, and the like, are used. Among them, a lithium secondary battery using lithium as an electrode is a representative example, and is practically used as a small-size power source for a portable telephone or a notebook-sized personal computer.

In a metal secondary battery, at the time of discharging, metal is dissolved from the negative electrode, and, on the contrary, at the time of charging, ions as it is dissolved in an electrolytic solution are deposited on the negative electrode. In the above-mentioned process, when minute projections and depressions are generated on the negative electrode due to various fluctuations, the electric field therein becomes locally strong, so that metal ions are easily attracted thereto. In general, when a voltage is applied to a construct made of metal, a stronger electric field tends to be generated in a sharper place of the construct. Consequently, reduction of metal ions proceeds particularly in the place, and long and slim extending dendritic crystals are grown therein. Therefore, there has been a problem that use of metal such as lithium for electrodes causes generation of dendrites (dendritic crystals) in the metal secondary battery at the time of charging and discharging. When the long and slim extending metal breaks through a separator of the battery, a short circuit occurs inside the battery. This problem is particularly serious in high-energy density batteries such as metal batteries.

As a method for suppressing generation of dendrites, conventionally, a method for modifying a surface of an electrode using additives that act on the surface of a negative electrode metal (for example, Patent Document 1), and formation of a ceramic composite layer or a solid electrolyte membrane on a separator (for example, Patent Documents 2 and 3) have been studied. However, effective improvement of performance has not been achieved.

Patent Document 1: Japanese Unexamined Patent Application, Publication No. 2004-172121
Patent Document 2: Japanese Unexamined Patent Application, Publication No. 2001-319634
Patent Document 3: Japanese Unexamined Patent Application, Publication No. 2004-259483

DISCLOSURE OF THE INVENTION

Problems to be Solved by the Invention

The present invention has been made in view of the above-mentioned circumstances, and an object thereof is to provide a separator capable of suppressing generation of dendrites by homogenizing an electric field of a surface of the negative electrode of a metal secondary battery.

Means for Solving the Problems

The inventors of the present invention have found that generation of dendrites accompanied by charging and discharging of a metal secondary battery can be suppressed by forming a polymer electrolyte layer on a surface layer of at least one main surface of a separator made of polyimide, and have reached completion of the present invention.

A first aspect of the present invention relates to a porous separator for metal secondary batteries including a porous polyimide film, and a polymer electrolyte layer formed on a surface layer of at least one main surface of the porous polyimide film.

A second aspect of the present invention relates to a metal secondary battery including an electrolytic solution and a porous separator for metal secondary batteries of the first aspect of the present invention disposed between a metal negative electrode and a positive electrode, wherein a main surface, having said polymer electrolyte layer, of the porous separator for metal secondary batteries is disposed in said metal negative electrode side.

Effects of the Invention

The present invention can provide a separator that suppresses generation of dendrites by homogenizing an electric field of a surface of a negative electrode of a metal secondary battery.

PREFERRED MODE FOR CARRYING OUT THE INVENTION

Figure 1:
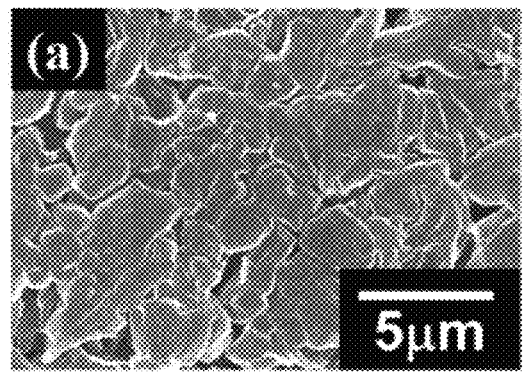
FIG. 1 shows a surface of a negative electrode when a coin cell of Comparative Example 1 is charged and discharged once at SOC 100%.

Hereinafter, embodiments of the present invention will be described in detail, but the present invention is not limited to the following embodiments and can be implemented with appropriate modifications within the purpose of the present invention.

A porous separator for metal secondary batteries of the first aspect of the present invention includes a porous polyimide film and a polymer electrolyte layer formed on a surface layer of at least one main surface of the porous polyimide film.

[Porous Polyimide Film]

A porous polyimide film used in the present invention is not particularly limited and any films may be used as long as they have aperture opening to both main surfaces and include pores communicating with each other inside the film.

From the viewpoint of homogenizing an electric field of a surface of a negative electrode of a metal secondary battery and effectively preventing generation of dendrites, it is preferable that continuous micropores in the porous polyimide film are three-dimensionally ordered. A three-dimensionally ordered structure means a structure in which adjacent voids are three-dimensionally ordered over the entire porous polyimide film. Accordingly, a porous polyimide film having a 3DOM (3-dimensional ordered macroporous) structure in which spherical pores are regularly adjacent to each other to form a hole is preferably used.

The porous polyimide film having the 3DOM structure mentioned above can be produced by, for example, a method using monodispersed spherical inorganic fine particles as a mold. In this case, the above-mentioned 3DOM structure having a hexagonal closest packing structure can be formed. Furthermore, by selecting a particle diameter of the monodispersed spherical inorganic fine particles as the mold, the void size of the porous polyimide film can be easily controlled from micro-order to nano-order. Furthermore, by controlling burning temperature and burning time of deposit of the monodispersed spherical inorganic fine particles, the size of the communicating pore can be easily controlled, and a porous polyimide film for a separator having desired characteristics can be produced.

<Porous Polyimide Film Having 3DOM Structure>

A porous polyimide film having a 3DOM structure mentioned above can be produced by, for example, the following method.

Firstly, a closest packing ordered product of monodispersed spherical inorganic fine particles is produced as a mold by dispersing monodispersed spherical inorganic fine particles in a solvent, and filtrating this dispersed liquid through a filter to deposit monodispersed spherical inorganic fine particles on the filter.

At this time, as the solvent, any solvents may be used as long as they do not dissolve inorganic fine particles and filters. For example, distilled water is preferable because it is used in a simple and easy manner. Furthermore, by changing a filtration amount of inorganic fine particles to be filtered per unit area of the filter, a thickness of deposited particles, that is, a film thickness of the porous polyimide film can be controlled. Furthermore, by changing the size of an inorganic fine particle, it is also possible to finally control the pore diameter of the separator. The void diameter after elution of the inorganic fine particles as a mold becomes generally somewhat smaller than the particle diameter of inorganic fine particles due to contraction of resin. Therefore, in view of finally required void porosity of film, contraction rate of resin, and required void diameter, the diameter of used inorganic fine particles may be selected.

Subsequently, the deposit obtained above is burned to form a sintered body (closest packing ordered product) of inorganic fine particles. At such a time, the above-mentioned deposit may be burned and sintered after it is peeled off from the filter, if necessary. This burning treatment is carried out in order to enhance the strength of the sintered body of inorganic fine particles. That is to say, by the burning treatment, the inorganic fine particles are sintered, and fusion bonding between inorganic fine particles is made, and the strength of the sintered body of inorganic fine particles can be enhanced. Furthermore, this can secure formation of communicating pores. By changing the burning temperature or time at this time, the sintering degree of the inorganic fine particles can be controlled, thus the size of communicating pore of the porous polyimide film having the 3DOM structure can be controlled. The burning temperature is only required to be not less than a temperature capable of sintering the inorganic fine particles to be used. Furthermore, the burning time may be an appropriate time depending on the required size of the communicating pore. For example, when silica fine particles are used as the inorganic fine particles, it is preferable that heat treatment is carried out at temperatures from 1000 to 1100° C. for 30 minutes to 12 hours.

Varnish containing polyamide acid or polyimide is filled into gaps in the sintered body of inorganic fine particles, then the resulting product is dried to remove a solvent, and the resulting product is further burned to form a complex of the polyimide and the sintered body. Impregnation of the sintered body with the varnish is not particularly limited and may be carried out by any methods. Impregnation is carried out preferably by a vacuum impregnation filling method. At this time, it is preferable that the amount of varnish for impregnation is such an amount that a film thickness is not more than a film thickness of a dried polyimide of the sintered body. By controlling the amount of resin for impregnation, the film thickness of the polyimide film containing the sintered body of inorganic fine particles can be controlled.

Burning conditions of polyimide are not particularly limited. For example, polyimide can be burned by a method of increasing a temperature from room temperature to 375° C. for three hours, and then maintaining the temperature at 375° C. for 20 minutes, and a stepwise drying—thermal imidization method of increasing a temperature in steps of 50° C. from room temperature to 375° C. (the temperature in each step is maintained for 20 minutes), and finally maintaining the temperature at 375° C. for 20 minutes.

Subsequently, a polyimide film containing the above-mentioned sintered body of inorganic fine particles is immersed in a solution that dissolves inorganic fine particles but does not dissolve resin, the sintered body of inorganic fine particles is dissolved and removed from the polyimide film containing the sintered body of inorganic fine particles so as to form a porous polyimide film having the 3DOM structure. Thereafter if necessary, the resulting porous polyimide film may be washed and dried.

In order to remove inorganic fine particles and the like, the inorganic fine particles can be removed by dissolution, for example, by treating the polyimide film containing the sintered body of inorganic fine particles using low-concentration hydrogen fluoride-water when silica is employed as inorganic fine particles, and using hydrochloric acid when calcium carbonate is employed.

Varnish to be Used

As mentioned above, in formation of a porous polyimide film, polyamide acid or polyimide is homogeneously dissolved in an organic solvent in advance, and formed into varnish, and the sintered body is impregnated with inorganic fine particles. For example, the varnish can be produced as follows.

Firstly, varnish containing polyamide acid or polyimide and an organic solvent is prepared. Varnish is prepared by mixing an organic solvent and polyamide acid or polyimide at an appropriate ratio, or by polymerizing polyamide acid in an organic solvent.

The polyamide acid to be used may be any one obtained by polymerizing appropriate tetracarboxylic dianhydride and diamine. The use amounts of the tetracarboxylic dianhydride and the diamine are not particularly limited, but the amount of the diamine is preferably 0.50 to 1.50 mol, more preferably 0.60 to 1.30 mol, and most preferably 0.70 to 1.20 mol, based on 1 mol of the tetracarboxylic dianhydride.

The tetracarboxylic dianhydride can be appropriately selected from tetracarboxylic dianhydride that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. The tetracarboxylic dianhydrides may be used in a combination of two or more thereof.

The diamine can be appropriately selected from diamines that have been conventionally used as raw materials for synthesizing polyamide acids. The diamine may be an aromatic diamine or an aliphatic diamine, but from the viewpoint of the heat resistance of the resulting polyimide resin, an aromatic diamine is preferred. These diamines may be used in a combination of two or more thereof.

Examples of the aromatic diamine include diamino compounds in which one phenyl group or about two to ten phenyl groups are bonded. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The polyamide acid to be used in the present invention may be produced by any method and, for example, can be produced by a known method, for example, by reacting an acid and a diamine component in an organic solvent.

The reaction of a tetracarboxylic dianhydride and a diamine is usually performed in an organic solvent. The organic solvent to be used for the reaction of a tetracarboxylic dianhydride and a diamine may be any organic solvent that can dissolve the tetracarboxylic dianhydride and the diamine without reacting with the tetracarboxylic dianhydride and the diamine. The organic solvent may be a single solvent or a mixture of two or more solvents.

Examples of the organic solvent to be used for the reaction of a tetracarboxylic dianhydride and a diamine include nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols. These organic solvents may be used alone or as a mixture of two or more thereof. The amount of the organic solvent is not particularly limited but is desirably such that the content of the resulting polyamide acid is 5% to 50% by mass.

Among these organic solvents, from the viewpoint of the solubility of the resulting polyamide acid, preferred are nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea.

The polymerization temperature is usually −10° C. to 120° C. and preferably 5° C. to 30° C. The polymerization time varies depending on the raw material composition and is usually 3 to 24 hours (hr). The organic solvent solution of the polyamide acid prepared under such conditions preferably has an intrinsic viscosity of 1000 to 100000 centipoises (cP), more preferably in a range of 5000 to 70000 cP.

The polyimide used in the present invention can be any known polyimide, without restricted by its structure and molecular weight, as long as the polyimide is soluble in the organic solvent to be used in the varnish of the present invention. The side chain of the polyimide may have a condensable functional group, such as a carboxy group, or a functional group enhancing the cross-linking reaction during burning.

In order to make the polyimide soluble in an organic solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in an organic solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used together within a range that does not inhibit the solubility.

<Porous Polyimide Film that does not have 3DOM Structure>

In addition to the above-mentioned porous polyimide film having a 3DOM structure, a porous polyimide film of the present invention may be produced by preparing varnish containing polyamide acid or polyimide and inorganic fine particles, forming it into a film once, and then burning the film to remove inorganic fine particles from the resulting polyimide-inorganic fine particle composite film by selecting an appropriate method. At this time, a step of removing at least a part of the polyimide portion on the surface of a polyimide-inorganic fine particle composite film may be carried out before the step of removing the fine particles, or a step of removing at least a part of the surface of the porous polyimide film may be carried out after the step of removing fine particles.

Burning conditions of polyimide are not particularly limited. For example, polyimide can be burned by a method of increasing a temperature from room temperature to 375° C. for three hours, and then maintaining the temperature at 375° C. for 20 minutes, and also a stepwise drying—thermal imidization method of increasing a temperature in steps of 50° C. from room temperature to 375° C. (the temperature in each step is maintained for 20 minutes), and finally maintaining the temperature at 375° C. for 20 minutes.

The porous polyimide film of the present invention can be produced with high reproducibility by removing inorganic fine particles from the polyimide-inorganic fine particle composite film obtained above by selecting appropriate methods depending on materials. For example, the methods described in the description of the above-mentioned porous polyimide film having the 3DOM structure can be employed without particular limitation.

Varnish to be Used

The above-mentioned varnish can be produced by mixing a polyamide acid or polyimide with an organic solvent in which inorganic fine particles are dispersed in advance at an appropriate ratio, or by polymerizing a tetracarboxylic dianhydride and a diamine into a polyamide acid in an organic solvent in which fine particles are dispersed in advance, or by further performing imidization into a polyimide. The final viscosity thereof is preferably adjusted to 300 to 1500 cP and more preferably in a range of 400 to 700 cP. The varnish having a viscosity within this range can be formed into a uniform film.

As the polyamide acid, polyimide, and inorganic fine particles to be used, those described in the description of the porous polyimide film having the 3DOM structure can be used without particular limitation. As the above-mentioned inorganic fine particles, any inorganic fine particles can be used without particular limitation as long as they are insoluble in an organic solvent to be used for the varnish and capable of being selectively removed after film formation.

It is preferable in the varnish that when fine particles are burned into a polyimide-inorganic fine particle composite film, the fine particles and the polyimide can be mixed with each other such that the ratio of the inorganic fine particles to polyamide is 2 to 6 (mass ratio), and preferably 3 to 5 (mass ratio). When the polyimide-inorganic fine particle composite film is formed, the fine particles and the polyamide acid or polyimide may be mixed with each other such that the volume ratio of the fine particles to the polyimide is 1.5 to 4.5. The ratio is more preferably 1.8 to 3 (volume ratio). In formation of the polyimide-inorganic fine particle composite film, the mass ratio of the fine particles to the polyimide of 2 or more allows an appropriate density of pores to be obtained for a separator; and the mass ratio of 6 or less allows a film to be stably formed without causing problems such as an increase in viscosity or cracking in the film.

The fine particles to be used in the present invention preferably have a high sphericity and a low particle diameter distribution index. Fine particles satisfying these requirements show excellent dispersibility in the varnish and can be used without causing aggregation with one another. As the fine particles, those having a particle diameter (average diameter) of, for example, 100 to 2000 nm can be used. The fine particles satisfying these requirements can provide pores having uniform pore diameters to the porous film by removing the fine particles and can homogenize the electric field to be applied.

When varnish including inorganic fine particles (hereinafter, referred to as "slurry") is prepared, for the purpose of uniformly dispersing the inorganic fine particles, a dispersant, together with inorganic fine particles, may be added to a mixture of polyamide acid or polyimide and a solvent. Addition of the dispersant allows further uniform mixing of the polyamide acid or polyimide with the inorganic fine particles and further uniform dispersion of the inorganic fine particles in the formed film. As a result, it is possible to provide the main surfaces of a finally obtained porous film with dense apertures, and to allow both main surfaces (front and rear surfaces) to be efficiently communicating with each other so as to improve the degree of uniformity of electric field of a surface of negative electrode when use as a separator.

The above-mentioned dispersant is not particularly limited and may be any well-known dispersants. Examples of the dispersant include, without limitation to, anionic surfactants, such as salts of coconut fatty acid, salts of sulfate castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants, such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants, such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants, such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants, such as polyoxyethylene dilaurate, polyoxyethylene laurate, polyoxyethylenated castor oil, polyoxyethylenated hydrogenated castor oil, sorbitan laurate ester, polyoxyethylene sorbitan laurate ester, and fatty acid diethanolamide; fatty acid alkyl esters, such as octyl stearate and trimethylolpropane tridecanoate; and polyether polyols, such as polyoxyalkylene butyl ether, polyoxyalkylene oleyl ether, and trimethylol propane tris(polyoxyalkylene) ether. These dispersants may be used as a mixture of two or more thereof.

[Polymer Electrolyte Layer]

A polymer electrolyte to be used for formation of a polymer electrolyte layer of the present invention may be an intrinsic polymer electrolyte or a mixture of an organic polymer and a liquid electrolyte.

The intrinsic polymer electrolyte is not particularly limited and any electrolytes capable of interacting with a metal ion in an electrolytic solution can be used. Examples thereof include polyether (PEO); a fluorine polymer having a perfluoroalkylene as a main skeleton and an ion exchange group such as a sulfonic acid group or a carboxylic acid group at a terminal of a perfluorovinyl ether side chain; polyacrylic acid (PAA) or polystyrene sulfonate (PSS); poly(allyl amine hydrochloride); quaternized poly(vinylpyridine); and the like, and copolymers thereof.

Among these intrinsic polymer electrolytes, a fluorine electrolyte polymer represented by a perfluorosulfonic acid polymer is preferable because it has extremely high chemical stability and suitable for an electrolyte film. Examples of such fluorine electrolyte polymers include a Nafion film (registered trademark of Du Pont), a Dow film (manufactured by Dow Chemical), an Aciplex film (registered trademark of Asahi Kasei Corporation), a Flemion film (registered trademark of ASAHI GLASS CO., LTD), and the like.

One of the above-mentioned polymer electrolytes is a mixture of an organic polymer and a liquid electrolyte. The mixture obtained by mixing an organic polymer and a liquid electrolytic solution into a gel is generally called a gel electrolyte. Examples thereof include polyoxyethylene (PEO), polyacrylonitrile (PAN), a copolymer of vinylidene fluoride (VdF) and tetrafluoroethylene (TFP), a copolymer of vinylidene fluoride (VdF) and hexafluoropropylene (HFP), a ternary copolymer of vinylidene fluoride (VdF), hexafluoropropylene (HFP) and tetrafluoroethylene (TFP), a polymer composition (polymer alloy) obtained by mixing a PVdF copolymer, polyvinylidene fluoride (PVdF) and polyoxyethylene (PEO), and the like, an acrylate polymer having PEO as a side chain, PVdF having PEO and acrylate as a side chain, and the like, without limitation thereto.

The liquid electrolytic solution with which the organic polymer is impregnated is not particularly limited and any organic solvents that dissolve a metal salt can be used. Examples of the organic solvent include one or two or more from well-known hydrocarbon solvents such as propylene carbonate, ethylene carbonate, butylene carbonate, γ-butyrolactone, 1,2-dimethoxyethane, 1,2-diethoxyethane, dimethyl carbonate, and diethyl carbonate; fluorine solvents such as fluoroethylene carbonate, fluoroether, and fluorinated carbonate, and the like.

Furthermore, specific examples of the metal salt include metal salt such as $LiClO_4$, $LiAsF_6$, $LiBF_4$, $LiPF_6$, $LiN(SO_2CF_3)_2$, $LiN(SO_2C_2F_5)_2$, without limitation thereto. Among them, from the viewpoint of cycle characteristics, in particular, $LiPF_6$, $LiBF_4$, $LiN(SO_2CF_3)_2$, $LiN(SO_2C_2F_5)_2$, or any combinations thereof are preferable.

The above-mentioned electrolyte polymer may further contain additives such as filler, other polymers, and a plasticizer.

The above-mentioned filler capable of being added to the polymer electrolyte may be organic particles or inorganic particles. From the viewpoint of heat resistance, inorganic fine particles are preferably used. Specific examples of the inorganic particles include particles of silicon or metal oxide, ceramics, and the like, but they are not limited thereto.

Examples of the above-mentioned oxide include $SiO_2$, $Al_2O_3$, $TiO_2$, $CeO_2$, $ZnO$, $ZrO_2$, and the like. Furthermore, the above-mentioned ceramics may be non-ionic conductive ceramics, or ionic conductive ceramics. However, the ionic conductive ceramics are preferable because they do not hinder the ionic conductivity of the electrolyte polymer in the hole of the porous polyimide film. Examples of the ionic conductive ceramics include $Li_2S$—$P_2S_5$ glass, $Na_2O$-$11Al_2O_3$, LTAP glass ceramic electrolyte ($Li_{1+x+y}Ti_{2-x}Al_xP_{3-y}Si_yO_{12}$ (x=0.3, y=0.2)), and the like, without limitation thereto.

A diameter of the filler is not particularly limited, but it is preferable to select a sufficiently smaller diameter than that of a void of a porous polyimide film when the void of the porous polyimide film is filled with a polymer electrolyte to form a polymer electrolyte layer.

The plasticizer is not particularly limited, but for example, an organic solvent for dissolving metal salt, such as polyethylene glycol dimethyl ester and propylene carbonate having high dielectric constant, can be used.

In order to homogenize an electric field of the surface of the negative electrode of a metal secondary battery, the above-mentioned polymer electrolyte layer is only required to be disposed between the negative electrode metal and the porous polyimide film. Accordingly, one method is providing the polymer electrolyte layer directly on the negative electrode metal. However, from the viewpoint of easiness of forming the polymer electrolyte layer and charge-discharge characteristics of the battery, it is preferable to provide a polymer electrolyte layer on the surface layer of the porous polyimide film.

When the porous separator includes the polymer electrolyte layer, the above-mentioned polymer electrolyte layer may be brought into contact with and supported on the main surface of the porous polyimide film, and may mainly be any one of a layer including only a polymer electrolyte, a layer, where polymer electrolyte is supported in the void of polyimide, or a composite layer including two continuous layers. It is preferable that a polymer electrolyte layer is formed of an electrolyte material supported on the main surface of the porous polyimide film, and a polymer electrolyte material supported in the void of the layered region that extends from the main surface.

A thickness of the electrolyte layer of the present invention is not limited, but the thickness is preferably smaller, because smaller thickness reduces the resistance and enhances the capacity retention rate of the battery. For example, the thickness is preferably 15 µm or less, more preferably 10 µm or less, further preferably 6 µm or less, and particularly preferably 5 µm or less. The lower limit value is not particularly limited, but it is preferable that at least voids forming an aperture in the main surface of the porous polyimide film are filled with polymer electrolyte, and the entire film surface is smoothened in homogenizing the electric field of the surface of the negative electrode.

Note here that when the polymer electrolyte layer is provided directly on the negative electrode, the thickness is required to be further thinner than the case where the polymer electrolyte layer is provided on the porous polyimide. For example, the thickness is preferably 5 µm or less. In this case, it is necessary to control the film thickness of the polymer electrolyte layer more strictly.

Examples of methods for forming a layer made of the polymer electrolyte on a surface layer of at least one main surface of the porous polyimide film include a method of producing a solution obtained by dissolving a polymer electrolyte in an organic solvent, and then roll coating the polymer electrolyte solution onto the porous polyimide film, a method of dipping the porous polyimide film into the polymer electrolyte solution, a method of laying the porous polyimide film on a base film to which a polymer electrolyte solution is applied, and filling the inside of the porous polyimide film with the polymer electrolyte solution using a capillary phenomenon, and the like, but the method is not limited thereto.

It is preferable to employ the above-mentioned method of filling the inside of the porous polyimide film with the polymer electrolyte solution using a capillary phenomenon, because a thinner polymer electrolyte layer can be formed.

[Metal Secondary Battery]

A second aspect of the present invention relates to a metal secondary battery including an electrolytic solution and a porous separator for metal secondary batteries according to the first aspect of the present invention disposed between a metal negative electrode and a positive electrode. The main surface of the porous separator for metal secondary batteries of the present invention at the side provided with a polymer electrolyte layer is disposed in a metal negative electrode side in use.

Types and configurations of the metal secondary battery of the present invention may not be particularly limited. Any well-known metal secondary batteries can be used without particular limitation as long as they have a structure in which battery elements including a positive electrode, a separator, and a negative electrode laminated in this order so as to satisfy the above-described requirements are impregnated with an electrolytic solution and are encapsulated in an outer package. The metal secondary battery of the present invention may be a metal-air battery using oxygen in the air as a positive electrode active material.

For the negative electrode of the secondary battery according to the present invention, lithium (Li), magnesium (Mg), sodium (Na), and alloys thereof with the other metal can be used.

For example, when the secondary battery is a lithium metal secondary battery, for the negative electrode, lithium alloys made of, for example, lithium-aluminum, lithium-lead, lithium-bismuth, lithium-indium, lithium-gallium, and lithium-indium-gallium, in addition to lithium (metallic lithium), may be used. Specifically, these lithium or lithium alloys can be press-fitted onto a current collector to form a negative electrode. In the case of a lithium alloy, it is preferable that the content of lithium is about 90 mass % or more.

A thickness of the negative electrode is not particularly limited, and the thickness may be in the well-known range. When the separator of the present invention is used, since the surface of the negative electrode becomes stable, the film thickness of the negative electrode can be reduced, and the capacity utilization factor of the negative electrode metal with respect to the positive electrode can be increased easily. For example, a thickness excluding a thickness of the current collector may be 15 to 700 μm. The thickness is preferably 600 μm or less, and further preferably 100 μm or less.

Furthermore, the positive electrode can have a structure in which a positive electrode material mixture including the positive electrode active material, a conductive auxiliary agent and a binder is formed on the current collector. For example, a positive electrode including manganese dioxide as an active material can be used. Specifically, for example, a positive electrode having a configuration in which a positive electrode material mixture layer containing manganese dioxide as the active material, a conductive auxiliary agent, and a binder is formed on one surface or both surfaces of the positive current collector can be used. Examples of the conductive auxiliary agent include carbon black, scale graphite, Ketjen black, acetylene black, fibrous carbon, and the like. Examples of the binder include polytetrafluoroethylene, polyvinylidene fluoride, carboxymethyl cellulose, styrene butadiene rubber, and the like.

When the secondary battery of the present invention is a lithium metal secondary battery, for example, as the positive electrode active material, lithium oxide, lithium phosphorus oxide, lithium sulfide, lithium-containing transition metal oxide, and the like, may be used. Specific examples include $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$, $LiAl_{0.25}Ni_{0.75}O_2$, and the like.

Examples of the lithium salt include $LiPF_6$, $LiBF_4$, and $LiClO_4$. Examples of the non-aqueous solvent include propylene carbonate, ethylene carbonate, dimethyl carbonate, diethyl carbonate, ethyl methyl carbonate, γ-butyrolactone, and vinylene carbonate. These may be used alone or as a mixture.

When the secondary battery of the present invention is a metal-air battery, the positive electrode to be used includes a catalyst layer that plays a role of absorbing oxygen from the air and converting it into hydroxide ions, and a current collector. The catalyst layer contains a current collector inside thereof. The current collector may be provided in the middle of the catalyst layer or may be formed in a layer on one side of the catalyst layer.

As the current collector of the positive electrode, materials that have conventionally been used as a current collector, for example, a porous structure such as carbon paper and metal mesh, a network structure, fiber, non-woven fabric, and the like, can be used without particular limitation. For example, metal mesh formed of SUS, nickel, aluminum, iron, titanium, and the like, can be used. As the other positive current collectors, a metal foil having an oxygen supplying hole can be used.

The above-mentioned catalyst layer contains an air electrode catalyst material. As the air electrode catalyst material, any catalysts can be used as long as they receive electrons generated at the negative electrode and reduce oxygen. For example, perovskite-type composite oxide such as lantern manganite represented by $La_{(1-x)}A_xMnO_3$ ($0.05<x<0.95$; A=Ca, Sr, Ba), manganese lower oxide such as $Mn_2O_3$, and $Mn_3O_4$, or carbon materials such as activated carbon, carbon, and a carbon nanotube are preferable, because they have oxygen reducibility and conductivity.

Examples of the outer package material include metal cans and aluminum laminate packs. The shape of the battery is, for example, a rectangular shape, a cylindrical shape, or a coin shape, and the separator of the present invention can be suitably applied to any shapes.

When the secondary battery of the present invention is a metal-air battery, a battery case may be an atmosphere-open battery case or a closed battery case. The atmosphere-open battery case has a structure in which at least air electrode is sufficiently brought into contact with atmospheric air. On the other hand, in the case of the closed battery, it is preferable that a tube introducing oxygen (air) that is a positive electrode active material and an exhaust tube are provided.

EXAMPLES (Production of Separator)
<Production of 3DOM Polyimide Separator>

As the following procedures, a porous polyimide film having a 3DOM structure (hereinafter, referred to as a "3DOM polyimide separator") was produced, and then provided with a polymer electrolyte layer to obtain separators A to C.

By using a homogenizer, 5 g of spherical silica (SEAHOSTAR (registered trademark) KE-P30, manufactured by NIPPON SHOKUBAI CO., LTD, median average particle diameter: 280 nm) was uniformly dispersed in 5 g of dimethylacetamide (DMAc) solvent. To 10 g of this dispersion liquid, 5.5 g of polyamic acid liquid (PMDA (pyromellitic dianhydride)/ODA (diamino diphenyl ether), manufactured by JFE Chemical Corporation) as a polyimide precursor was added, uniformly mixed using a deaerator and agitator "Awatori Rentaro" (manufactured by Thinky Co. Ltd.) to obtain silica/polyimide precursor slurry.

The slurry was formed into a film having a thickness of about 25 μm on a glass plate that had been spin-coated with a phosphate ester release agent. Film formation was carried out in an area of 10 cm×10 cm by doctor blading using an automatic film formation device. This was allowed to stand at room temperature for five hours, waited until the film naturally peeled off from the glass plate. After the peeling, a release agent was removed with methanol. Then, the film was fixed to the framework made of SUS, and subjected to stepwise heat treatment at temperatures from 100° C.→200° C.→300° C.→400° C. to complete imidization to obtain a silica-polyimide composite film. The silica-polyimide composite film was immersed in 10 mass % hydrofluoric acid solution, and silica was removed by dissolution over six hours. After removal, the resulting product was deliberately washed with water to obtain a 3DOM polyimide separator.

<Separator A>

As a polymer component of a polymer electrolyte, a star-structured polymer (S-MES polymer) (Nippon Soda Co., Ltd.) in which a block copolymer of PEO methacrylate ester (PEGMA) and polystyrene (PSt) spread radially from the center was used. Lithium salt was added to a solution dissolving 30 weight % S-MES polymer in 1,2-dimethoxyethane (DME) so that the stoichiometric ratio of lithium ([Li]) in lithium salt ($LiPF_6$) to ethylene oxide ([EO]) in the S-MES polymer ([Li]/[EO]) was 0.01 so as to obtain a polymer electrolyte solution.

The above-mentioned polymer electrolyte solution was dropped onto a glass substrate to a thickness of 5 μm. The 3DOM polyimide separator was allowed to stand still thereon from above, so that the polymer electrolyte solution was filled into the voids of the above-mentioned 3DOM polyimide separator. Thereafter, the solvent was removed by vacuum drying, and the separator was peeled off from the glass substrate to produce a separator having a polymer electrolyte layer on only one side of the 3DOM polyimide separator. Observation of the cross-section of the separator showed that hole was filled with polymer electrolyte to a place at about 8 μm from the surface. The thickness of a polymer electrolyte layer on the 3DOM polyimide separator was about 3 μm.

<Separator B>

A separator was produced in the same manner as in separator A except that lithium salt of the polymer electrolyte was adjusted so that the stoichiometric ratio of [Li]/[EO] was 0.02.

<Separator C>

A separator was produced in the same manner as in separator A except that lithium salt of the polymer electrolyte was adjusted so that the stoichiometric ratio of [Li]/[EO] was 0.03.

Production of Negative Electrode for Evaluation

Reference Example 1

In an argon-atmosphere dry box, 20 μm-thick metallic lithium provided with a copper foil having a thickness of about 10 μm was allowed to stand still on a glass substrate such that a copper foil faces a surface of the glass substrate. The above-mentioned polymer electrolyte solution was applied to the metallic lithium by a doctor blade method. Thereafter, a DME solvent was removed by vacuum drying, and a negative electrode provided with a polymer electrolyte layer was peeled off from the glass substrate. A thickness of the polymer electrolyte layer formed on the metallic lithium of the negative electrode was about 9 μm.

Reference Example 2

In an argon-atmosphere dry box, 20 μm-thick metallic lithium provided with a copper foil having a thickness of about 6 μm was allowed to stand still on the glass substrate such that a copper foil faces a surface of the glass substrate. The above-mentioned polymer electrolyte solution was applied to the metallic lithium by a doctor blade method. Thereafter, a DME solvent was removed by vacuum drying, and a negative electrode provided with a polymer electrolyte layer was peeled off from the glass substrate. A thickness of the polymer electrolyte layer formed on the metallic lithium of the negative electrode was about 5 to 6 μm. Note here that it is demonstrated that the thickness of the polymer electrolyte layer can be controlled by a gap (coating thickness) of the blade when the metallic lithium as a negative electrode is coated with the polymer electrolyte solution. For example, when 20 μm-thick lithium metal and 6 μm-thick copper foil are allowed to stand still on the glass substrate, and the glass substrate is coated with a polymer electrolyte liquid from above with a gap of 50 μm, the thickness of the polymer electrolyte solution is 24 (50–20–6) μm. Thereafter, it is dried and peeled off from the glass substrate to produce the negative electrode having a polymer electrolyte layer with a thickness of 8 to 10 μm.

Reference Example 3

A negative electrode provided with a polymer electrolyte layer was produced in the same manner as in Reference Example 2 except that the concentration of the S-MES polymer in 1,2-dimethoxyethane (DME) as the polymer electrolyte solution was adjusted to 10 weight %.

Reference Example 4

A negative electrode provided with a polymer electrolyte layer was produced in the same manner as in Reference Example 3 except that a thickness of the polymer electrolyte layer formed on the metallic lithium of the negative electrode was adjusted to 4 to 5 μm. Note here that in this Reference Example, coating with the polymer electrolyte solution was carried out with a gap of 40 μm.

Reference Example 5

A negative electrode provided with a polymer electrolyte layer was produced in the same manner as in Reference Example 3 except that a thickness of the polymer electrolyte layer formed on the metallic lithium of the negative electrode was adjusted to 3 to 4 μm. Note here that in this Reference Example, coating with the polymer electrolyte solution was carried out with a gap of 30 μm.

Comparative Examples 1, 2

Only 20 μm-thick lithium metal provided with a copper foil having a thickness of about 10 μm was a negative electrode.

Comparative Example 3

Only 20 μm-thick lithium metal provided with a copper foil having a thickness of about 6 μm was a negative electrode.

(Production of Coin Cell for Evaluation)

An active material $LiCoO_2$ (LCO), acetylene black as a conductive auxiliary agent, and PVDF as a binder were mixed into 1-methyl-2-pyrolidone (NMP) in the weight ratio of 92:4:4 to prepare slurry as the positive electrode active material. This slurry was applied onto a current collector Al foil, and dried to produce a coated electrode. This coated electrode was punched out into a circular form having a diameter of 14 mm to obtain a positive electrode. Furthermore, for the negative electrode, 20 μm-thick metallic lithium provided with a copper foil having a thickness of 10 μm was punched out into a circular form and used.

As an electrolytic solution, a solution obtained by dissolving 1.0 $moldm^{-3}$ of $LiPF_6$ as a support salt in ethylene carbonate was used. The above-mentioned positive electrode, negative electrode, electrolytic solution and separator were incorporated into a 2032 type coin cell to produce the following cells for evaluation.

For separators for the coin cells of Examples 1 to 3, the separators of the above-mentioned A to B were respectively used and disposed such that a polymer electrolyte layer faces the negative electrode side. For the separators for the coin cells of Comparative Examples 1 and 3, untreated 3DOM separators were used as it is. Furthermore, for the coin cells of Reference Examples 1 to 5, the negative electrode was replaced by the above-mentioned negative electrode for reference evaluation, and untreated 3DOM separators were used as it is for the separator.

(Constant Current Charge-Discharge Measurement)

The coin cell produced for testing was subjected to a charge-discharge test in which the initial cycle test was carried out at a cut-off voltage of 3.0 to 4.2 V inside a thermostat at 30° C. using a battery charge-discharge device HJ1001SM8A (manufactured by HOKUTO DENKO CORPORATION) and a charge and discharge tester TOSCAT-3000U (manufactured by Toyo System Co., Ltd.). The charging was carried out in the condition at CC of 0.2 C until a voltage reached 4.2 V, and then in the condition at CV until a current reached 0.02 C. As the conditions for the cycle characteristics test after the initial cycle test, the charge-discharge test was carried out at a cut-off voltage of 3.0 to 4.2 V in a thermostat at 30° C. The charging was carried out in the condition at CC of 1.0 C until a voltage reached 4.2 V, and then in the condition at CV until a current reached 0.1 C. The discharging was carried out in the condition at CC of 1.0 C until a voltage reached 3.0 V. Evaluation results of the charge-discharge Coulomb efficiency and the capacity retention rate of each coin cell produced for testing are shown in Tables 1 and 2.

As is apparent from the results shown in Table 1, while the capacity retention rate of Comparative Example 1 was 35.2%, the capacity retention rates of Examples 1 to 3 using the separator of the present invention were 45.6 to 50.3% showing especially improved values as compared with the value of Comparative Example 1. This result is considered to be because the performance of the negative electrode was retained even after 100 cycles by the polymer electrolyte layer that was brought into contact with the surface of the negative electrode.

On the other hand, the capacity retention rate of Reference Example 1 in which the polymer electrolyte layer was directly provided on the electrode surface of the negative electrode was improved as compared with that of Comparative Example 1 in which a polymer electrolyte layer was not provided. Furthermore, it was confirmed that the capacity retention rates of Examples 1 to 3, in which the polymer electrolyte layer was provided not on the negative electrode but on the porous polyimide, were higher than the capacity retention rate of Reference Example 1.

As is apparent from the results shown in Table 2, as the concentration of the S-MES polymer in 1,2-dimethoxyethane (DME) as a polymer electrolyte solution was smaller, a thickness of the polymer electrolyte layer formed on the negative electrode became smaller, thus improving the capacity retention rate. This result is considered to be because the polymer electrolyte layer serves as a protective layer on the surface of the lithium metal that was a negative electrode, and the decomposition reaction of the electrolyte solution at the time of charging and discharging was suppressed, and because when the thickness was smaller, the electrolytic conductive resistance in the battery was reduced.

TABLE 1

| Cell | Separator used | Polymer electrolyte [Li]/[EO] ratio | Thickness of negative electrode (μm) | Thickness of polymer electrolyte layer on negative electrode (μm) | Capacity retention rate (%) | Charge-discharge Coulomb efficiency (%) |
|---|---|---|---|---|---|---|
| Example 1 | A | 0.01 | 20 | — | 45.6 | 97.9 |
| Example 2 | B | 0.02 | 20 | — | 46.2 | 97.9 |
| Example 3 | C | 0.03 | 20 | — | 50.3 | 97.9 |
| Comparative Example 1 | 3DOM | — | 20 | — | 35.2 | 98.5 |
| Reference Example 1 | 3DOM | 0.01 | 20 | 9 | 37.5 | 98 |

TABLE 2

| Cell | Concentration of polymer electrolyte weight % | Thickness of polymer electrolyte layer (μm) | Capacity retention rate (%) | Charge-discharge Coulomb efficiency (%) |
|---|---|---|---|---|
| Reference Example 1 | 30 | 9 | 37.5 | 98 |
| Reference Example 2 | 30 | 8~10 | 48.8 | 97.5 |
| Reference Example 3 | 10 | 5~6 | 52.7 | 97.9 |
| Reference Example 4 | 10 | 4~5 | 61.1 | 96.2 |
| Reference Example 5 | 10 | 3~4 | 74.4 | 97.8 |
| Comparative Example 3 | — | — | 48.1 | 97.1 |

(Alternating Current Impedance Measurement)

Measurement of the battery internal resistance of each of the coin cells of Example 3 and Comparative Example 1 and Reference Example 5 and Comparative Example 3 was carried out by using Solartron 1287 potentiostat/galvanostat and 1255B high-frequency response analyzer, in a thermostat at 30° C. before the cycle characteristics test, and after 1 cycle, 50 cycles and 100 cycles of the cycle characteristics test. Measurement conditions include input alternating current amplitude of 5 mV and frequency range of 10 mHz to 1.0 MHz. Evaluation results of Rf and Rc of each coin cell produced for testing before the cycle characteristics test (0 cycle), and after 50 cycles and 100 cycles are shown in Tables 3 and 4.

The alternating current impedance is originated in the resistance (Rf) by formation and growth of a solid electrolyte interface (SEI) on the electrode surface in the high frequency region; and is originated in the charge-transfer resistance (Rct) of electrode, SEI, and electric in the electrolyte layer in the low frequency region. After the first cycle, since Rf of the coin cell of Example 3 is reduced, it is suggested that some ion conduction route is formed in the lithium metal negative electrode and a polymer electrolyte layer. Furthermore, in Example 3, as compared with Comparative Example 1, the increase of Rct by the charge-discharge cycle test is suppressed, suggesting that the surface of the lithium metal negative electrode is stabilized by the polymer electrolyte layer.

In the coin cell of Reference Example 5, having a negative electrode provided with a polymer electrolyte layer, Rf after 50 cycles and Rf after 100 cycles were increased from 30Ω to 70Ω. In contrast, in the coin cell of Comparative Example 3, which includes only lithium metal, Rf after 50 cycles and Rf after 100 cycles were increased from 17Ω to 100Ω. In Reference Example 5, as compared with Comparative Example 3, the increase of Rf after 100 cycles is reduced.

This is considered to be because the solid electrolyte interface (SEI) was formed by the reaction between the electrode and the electrolytic solution, and in Reference Example 5, since the polymer electrolyte layer was a protective film of the negative electrode, increase of Rf by the formation of the solid electrolyte interface was mitigated. Furthermore, in Reference Example 5, as compared with Comparative Example 3, the increase of Rct by the charge-discharge cycle test was suppressed, suggesting that the surface of the lithium metal negative electrode is stabilized by a polymer electrolyte layer.

TABLE 3

| Cell | | Example 3 | Comparative Example 1 |
|---|---|---|---|
| Separator used | | C | 3DOM |
| Polymer electrolyte [Li]/[EO] ratio | | 0.03 | — |
| Thickness of negative electrode (μm) | | 20 | 20 |
| Rf(Ω) | 0 cycle | 149.6 | 44.5 |
| | 50 cycles | 17.4 | 22.9 |
| | 100 cycles | 25.5 | 23.1 |
| Rct(Ω) | 0 cycle | — | — |
| | 50 cycles | 93.8 | 125.7 |
| | 100 cycles | 206.9 | 271.2 |

TABLE 4

| Cell | | Reference Example 5 | Comparative Example 3 |
|---|---|---|---|
| Negative electrode | | Li + polymer electrolyte layer | Only Li |
| Rf(Ω) | 0 cycle | 56 | 131 |
| | 50 cycles | 30 | 17 |
| | 100 cycles | 70 | 100 |
| Rct(Ω) | 0 cycle | — | — |
| | 50 cycles | 66 | 61.5 |
| | 100 cycles | 162 | 348 |

(Observation of Surface of Negative Electrode)

From the coin cells of Example 3 and Comparative Example 1 charged with a charge amount corresponding to 100% of the LCO electrode capacity, and the coin cells of Example 3 and Comparative Example 1 after 100 cycles of the above-mentioned charge-discharge test, lithium negative electrodes were taken out, respectively. The surface of each lithium negative electrode was observed by using a scanning electron microscope JSM-5310, SEM (manufactured by JEOL Ltd.). Furthermore, in a coin cell (Comparative Example 2) using a commercially available polypropylene separator, a lithium negative electrode, which had been subjected to the same condition, was subjected to observation of the surface thereof. Furthermore, in the coin cells of Reference Examples 2 to 5 and Comparative Example 3, the same observation of lithium negative electrode which had been subjected to the same condition was carried out.

Figure 2:
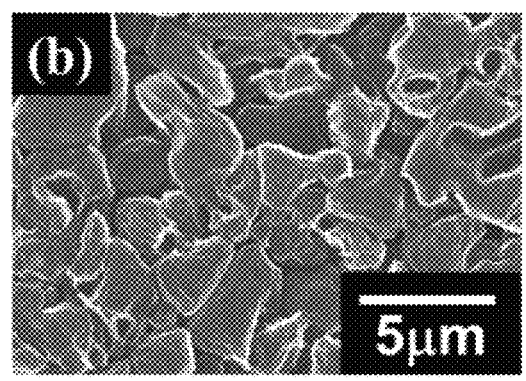
FIG. 2 shows a surface of a negative electrode when a coin cell of Example 3 is charged and discharged once at SOC 100%.
Figure 3:
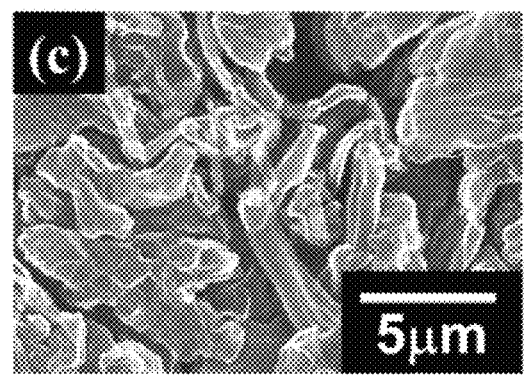
FIG. 3 shows a surface of a negative electrode when a coin cell of Comparative Example 2 is charged and discharged once at SOC 100%.
Figure 4:
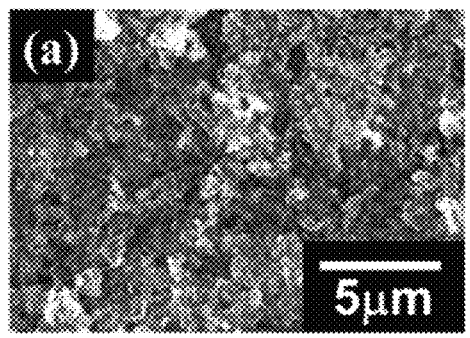
FIG. 4 shows a surface of the negative electrode of the coin cell of Comparative Example 1 after 100 cycles.
Figure 5:
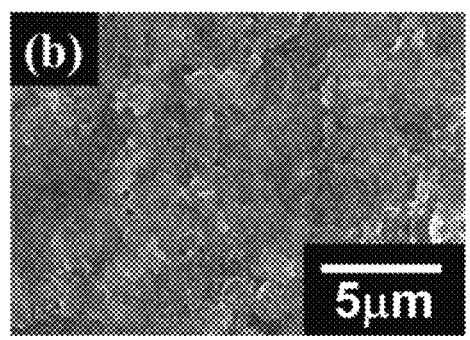
FIG. 5 shows a surface of the negative electrode of the coin cell of Example 3 after 100 cycles.
Figure 6:
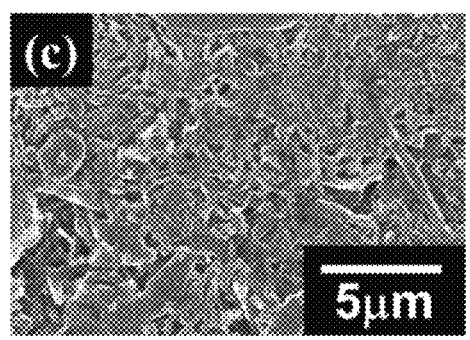
FIG. 6 shows a surface of the negative electrode of the coin cell of Comparative Example 2 after 100 cycles.
Figure 7:
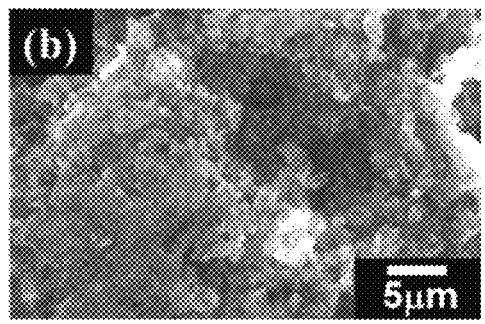
FIG. 7 shows a surface of a negative electrode of a coin cell of Reference Example 2 after 100 cycles.
Figure 8:
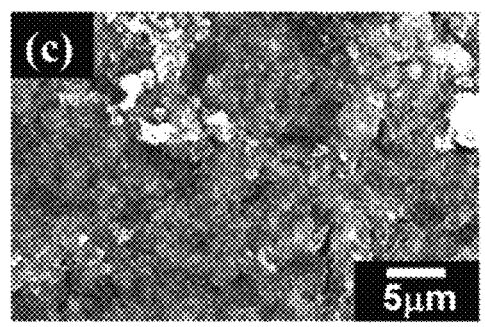
FIG. 8 shows a surface of a negative electrode of a coin cell of Reference Example 3 after 100 cycles.
Figure 9:
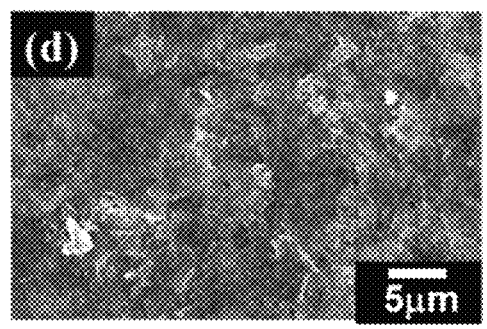
FIG. 9 shows a surface of a negative electrode of a coin cell of Reference Example 4 after 100 cycles.
Figure 10:
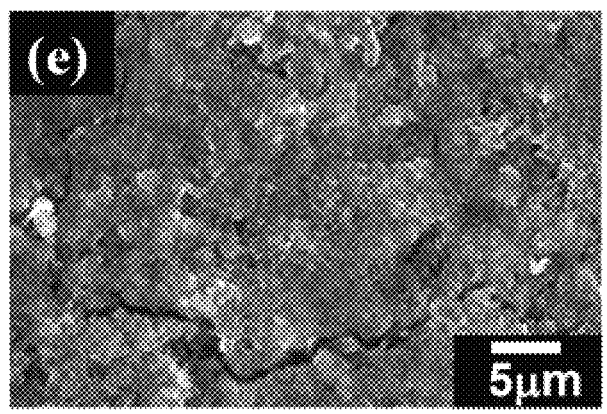
FIG. 10 shows a surface of a negative electrode of a coin cell of Reference Example 5 after 100 cycles.
Figure 11:
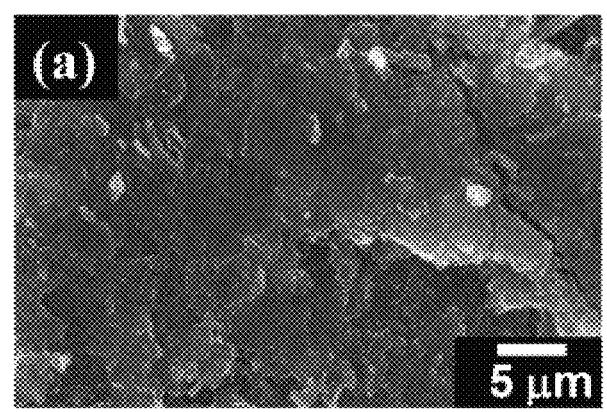
FIG. 11 shows a surface of a negative electrode of a coin cell of Comparative Example 3 after 100 cycles.

FIGS. 1 to 3 show the surface of the lithium metal negative electrode charged with a charge amount corresponding to 100% of the LCO electrode capacity; and FIGS. 4 to 11 show the surface of the lithium metal negative electrode after 100 cycles, respectively. FIGS. 1 and 4 show the lithium metal negative electrode taken out from the coin cell corresponding to Comparative Example 1. Furthermore, FIGS. 2 and 5 show a lithium metal negative electrode taken out from the coin cell corresponding to that of Example 3, and FIGS. 3 and 6 show a lithium metal negative electrode taken out from the coin cell corresponding to that of Comparative Example 2. FIGS. 7 to 10 show a lithium metal negative electrode taken out from the coin cell corresponding to those of Reference Examples 2 to 5. FIG. 11 shows a lithium metal negative electrode taken out from the coin cell corresponding to that of Comparative Example 3.

In FIG. 3, on the surface of the lithium metal negative electrode obtained from the coin cell using the polypropylene separator of Comparative Example 2, lithium dendrite was observed. In contrast, on the surfaces of the separator according to Example 3 of the present invention shown in FIGS. 2 and 1 and the lithium metal negative electrode using a 3DOM separator according to Comparative Example 1, precipitates of lithium were observed but they are small particles and not needle-like particles. Furthermore, as shown in FIG. 5, the surface of the lithium metal negative electrode of Example 3 kept a relatively smooth surface even after 100 cycles. This shows that use of a porous separator for metal secondary batteries in which the polymer electrolyte layer of the present invention is formed makes lithium to be precipitated smoothly on the surface of the lithium metal negative electrode.

In FIG. 11, on the surface of the negative electrode including only lithium metal of Comparative Example 3, a polymer electrolyte layer is not provided, but 3DOM is used as a separator, so that lithium dendrite is not observed, and precipitation of minute particulate lithium was observed. In contrast, in FIGS. 7 to 10, on the surface of the lithium metal negative electrode provided with a polymer electrolyte layer of Reference Examples 2 to 5, precipitation of even a small particulate lithium was not observed, the smooth surface was kept. This shows that use of the lithium metal negative electrode provided with the polymer electrolyte layer of the present invention makes lithium precipitated smoothly on the surface of the lithium metal.

The invention claimed is:

1. A porous separator comprising a porous polyimide film and a polymer electrolyte layer formed on a surface layer of a main surface of the porous polyimide film,
    wherein the polymer electrolyte layer is formed of a polymer electrolyte material supported on the main surface of the porous polyimide film and a polymer electrolyte material supported in pores in a layered region that extends from the main surface,
    wherein the polymer electrolyte material supported on the main surface of the porous polyimide film and the polymer electrolyte material supported in pores in the layered region that extends from the main surface are the same, wherein the pores forming apertures in the main surface of the porous polyimide film are filled with the polymer electrolyte material thereby smoothening the main surface of the porous polyimide film, wherein the porous polyimide film has a 3-dimensional ordered microporous (3DOM) structure in which spherical pores are three-dimensionally adjacent to each other to form pores communicating with each other inside the film, and wherein the porous polyimide film has a layered region in an area where the polymer electrolyte layer is not formed in the pores of the 3DOM structure.

2. The porous separator according to claim 1, wherein the polymer electrolyte layer comprises at least one of a metal salt and a filler.

3. A lithium metal secondary battery comprising an electrolytic solution and the porous separator according to claim 1 disposed between a metal negative electrode and a positive electrode, wherein the main surface, having the polymer electrolyte layer, of the porous separator is disposed in the metal negative electrode side.

4. The lithium metal secondary battery according to claim 3, wherein the porous polyimide film does not contain an inorganic fine particle.

5. The lithium metal secondary battery according to claim 3, wherein the polymer electrolyte layer has a thickness of 5 µm or less.

6. The porous separator according to claim 1, wherein the polymer electrolyte material of the polymer electrolyte layer is an electrolyte capable of interacting with a metal ion in an electrolytic solution, and the polymer electrolyte material consists essentially of at least one selected from polyether, fluorine polymer, polyacrylic acid, polystyrene sulfonate, poly(allyl amine hydrochloride), quaternized poly(vinylpyridine) and copolymers thereof.

7. The porous separator according to claim 1,
wherein the polymer electrolyte material of the polymer electrolyte layer consists essentially of a mixture consisting of an organic polymer and a liquid electrolytic solution,
wherein the liquid electrolytic solution is an organic solvent in which a metal salt is dissolved,
wherein the metal salt is at least one selected from LiClO$_4$, LiAsF$_6$, LiBF$_4$, LiPF$_6$, LiN(SO$_2$CF$_3$)$_2$ and LiN(SO$_2$C$_2$F$_5$)$_2$, and
wherein the organic solvent is at least one selected from a hydrocarbon solvent and a fluorine solvent.

8. The porous separator according to claim 7,
wherein the hydrocarbon solvent is at least one selected from propylene carbonate, ethylene carbonate, butylene carbonate, γ-butyrolactone, 1,2-dimethoxyethane, 1,2-diethoxyethane, dimethyl carbonate and diethyl carbonate.

9. The porous separator according to claim 7,
wherein the fluorine solvent is at least one selected from a fluoroethylene carbonate, a fluoroether and a fluorinated carbonate.

10. The porous separator according to claim 7,
wherein the organic polymer is at least one selected from polyoxyethylene (PEO), polyacrylonitrile (PAN), a copolymer of vinylidene fluoride (VdF) and tetrafluoropropylene (TFP), a copolymer of vinylidene fluoride (VdF) and hexafluoropropylene (HFP), a ternary copolymer of vinylidene fluoride (VdF), hexafluoropropylene (HFP) and tetrafluoropropylene (TFP), a polymer composition (polymer alloy) obtained by mixing a PVdF copolymer or polyvinylidene fluoride (PVdF) and polyoxyethylene (PEO), an acrylate polymer having PEO as a side chain, and PVdF having PEO or acrylate as a side chain.

11. The porous separator according to claim 1, wherein the porous polyimide film does not contain an inorganic fine particle.

12. The porous separator according to claim 1, wherein the polymer electrolyte layer has a thickness of 5 µm or less.

13. The porous separator according to claim 1, wherein the polymer electrolyte material is a block copolymer of polyoxyethylene methacrylate ester and polystyrene.

14. A method for producing a lithium metal secondary battery comprising disposing an electrolytic solution and the porous separator according to claim 1 between a metal negative electrode and a positive electrode,
wherein the main surface, having the polymer electrolyte layer, of the porous separator is disposed in the metal negative electrode side.

15. The method for producing a lithium metal secondary battery according to claim 14, wherein the porous separator is produced by
producing a polymer electrolyte solution,
laying a porous polyimide film on a base film to which the polymer electrolyte solution is applied, and
filling the inside of the porous polyimide film with the polymer electrolyte solution.

16. A method for producing a porous separator according to claim 1 comprising
producing a polymer electrolyte solution,
laying a porous polyimide film on a base film to which the polymer electrolyte solution is applied, and
filling the inside of the porous polyimide film with the polymer electrolyte solution.

17. A method for producing a porous separator comprising
producing a polymer electrolyte solution,
laying a porous polyimide film on a base film to which the polymer electrolyte solution is applied, and
filling the inside of the porous polyimide film with the polymer electrolyte solution,
wherein the porous separator comprises a porous polyimide film and a polymer electrolyte layer formed on a surface layer of a main surface of the porous polyimide film,
wherein the polymer electrolyte layer is formed of a polymer electrolyte material supported on a main surface of the porous polyimide film and a polymer electrolyte material supported in pores in a layered region that extends from the main surface,
wherein the polymer electrolyte material supported on a main surface of the porous polyimide film and the polymer electrolyte material supported in pores in a layered region that extends from the main surface are the same,
wherein the porous polyimide film has a 3-dimensional ordered microporous (3DOM) structure in which spherical pores are three-dimensionally adjacent to each other to form pores communicating with each other inside the film, and
wherein the porous polyimide film has a layered region in an area where the polymer electrolyte layer is not formed in the pores of the 3DOM structure.

18. The method for producing a porous separator according to claim 17, wherein the polymer electrolyte material is a block copolymer of polyoxyethylene methacrylate ester and polystyrene.

19. A method for producing a lithium metal secondary battery comprising disposing an electrolytic solution and the porous separator of claim 1 between a metal negative electrode and a positive electrode,
- wherein a main surface, having a polymer electrolyte layer, of the porous separator is disposed in a metal negative electrode side,
- wherein the porous separator is produced by
  - producing a polymer electrolyte solution,
  - laying a porous polyimide film on a base film to which the polymer electrolyte solution is applied, and
  - filling the inside of the porous polyimide film with the polymer electrolyte solution,
- wherein the porous separator comprises a porous polyimide film and the polymer electrolyte layer formed on a surface layer of a main surface of the porous polyimide film,
- wherein the polymer electrolyte layer is formed of a polymer electrolyte material supported on a main surface of the porous polyimide film and a polymer electrolyte material supported in pores in a layered region that extends from the main surface, and
- wherein the polymer electrolyte material supported on a main surface of the porous polyimide film and the polymer electrolyte material supported in pores in a layered region that extends from the main surface are the same.

* * * * *